United States Patent Office 3,444,714
Patented May 20, 1969

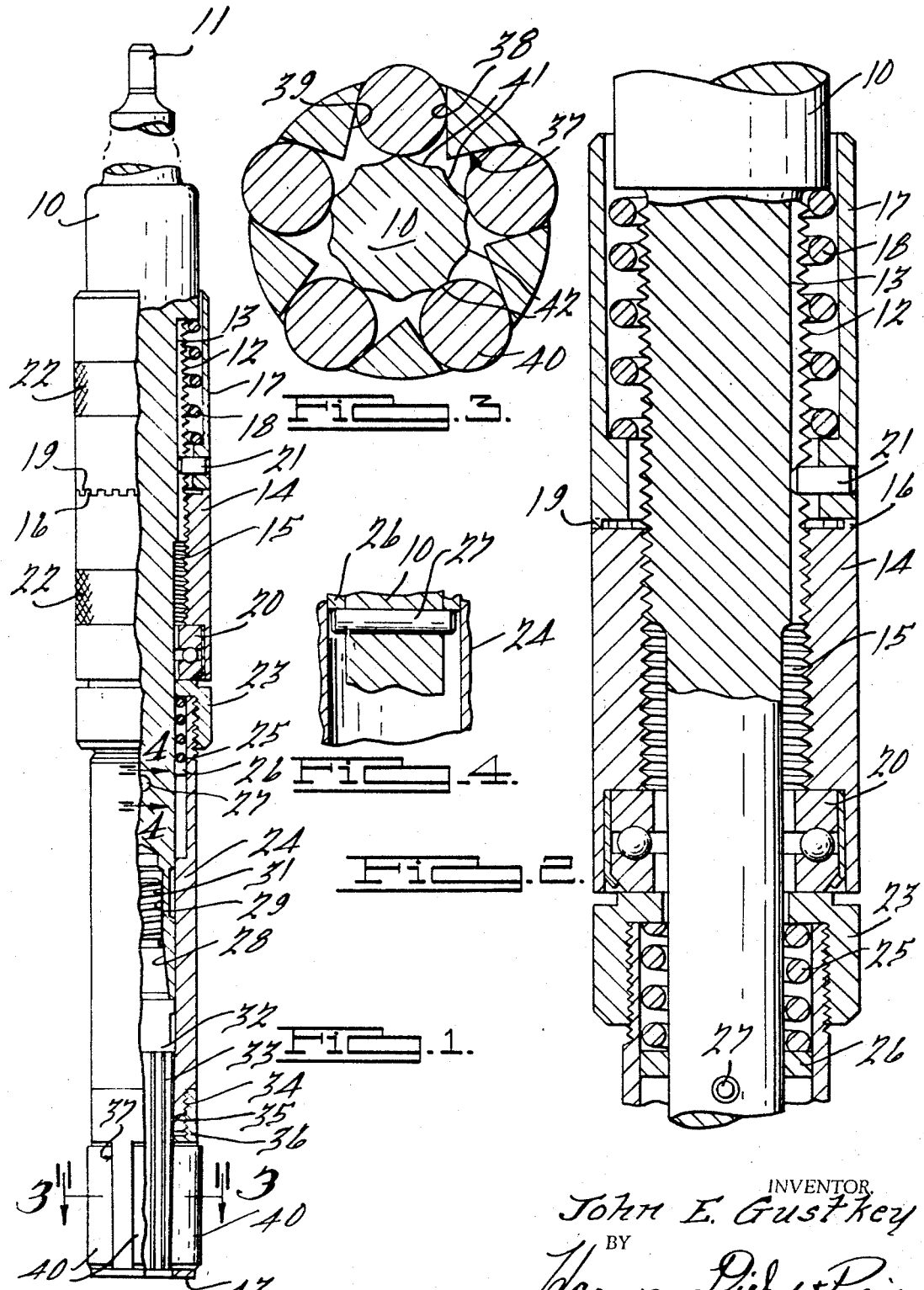

3,444,714
ADJUSTABLE PEENING TOOL
John E. Gustkey, Detroit, Mich., assignor to Cogsdill Tool Products, Inc., a corporation of Michigan
Filed Aug. 21, 1967, Ser. No. 662,023
Int. Cl. B21d 3/06, 31/00, 41/00
U.S. Cl. 72—76                              6 Claims

ABSTRACT OF THE DISCLOSURE

The disclosure pertains to a tool having a rotatable cage with tapered rollers supported therein and engaged by a central tapered end of a driving arbor. The tapered end has axially disposed flutes therein for moving the rollers radially outward. The arbor is longitudinally adjusted relative to the rollers so that the tapered end can change the overall diameter of the rollers.

Background of the invention

The peening tools have heretofore been provided employing balls and rollers which were urged outwardly through the relative rotation of a fluted cylindrical arbor which did not provide diametrical adjustment.

Summary of the invention

The invention follows substantially the form of a tool illustrated and described and claimed in the patent to J. T. Morrison, No. 3,099,070, issued July 30, 1963 for a metalworking tool which was assigned to the assignee of the present invention. This tool has a tapered end operating on tapered rollers which are angularly disposed to planes through the arbor axis and which are adjusted radially by the longitudinal adjustment of the arbor and the tapered end. The present invention advances the art of burnishing by disposing the rollers in planes through the arbor axis and by fluting the tapered end in said planes. Substantially twice the number of flutes are employed relative to the number of rollers mounted in a cage which is freely rotatable about the arbor. When the rollers engage the surface of an aperture in a workpiece they rotate in the same manner as the pinion gears of a planetary system, advancing between the aperture surface and the tapered end of the arbor. In view of the flutes on the tapered end, the rollers will move inwardly and be forced outwardly to produce the peening operation.

Brief description of the drawings

FIGURE 1 is a broken sectional view of a metalworking tool embodying features of the present invention;

FIG. 2 is a sectional view of the structure illustrated in FIG. 1, taken on the line 2—2 thereof;

FIG. 3 is an enlarged, broken sectional view of the central portion of the tool illustrated in FIG. 1, and FIG. 4 is an enlarged, broken sectional view of the structure illustrated in FIG. 1, taken on the line 4—4 thereof.

Description of the preferred embodiment

Referring to the figures, an arbor 10 of cylindrical form has a driving end 11 and an external, inwardly recessed thread 12 at the upper end. The thread 12 is interrupted by a slot 13 disposed longitudinally of the arbor. An adjusting sleeve 14 has an internal thread 15 screwed upon the thread 12 for adjustment longitudinally of the arbor. The sleeve 14 has upwardly extending teeth 16 on the top edge in engaged relation with downwardly extending teeth 19 on a locking sleeve 17 disposed about the arbor. The locking sleeve extends over a spring 18 which encompasses the upper end of the recessed thread 12. The sleeve 17 is retained against rotation by a pin 21 extending within the slot 13 cut into the thread 12.

Knurled surfaces 22 are provided upon the sleeves 14 and 17 so that a firm grip may be had when moving the sleeve 17 longitudinally for separating the teeth 19 from the teeth 16 and rotating the sleeve 14 on the thread 12 for moving the sleeve 14 longitudinally on the arbor 10. A ball bearing 20 is carried in a recess within the end of a sleeve 14 in position to abut against an internally threaded collar 23 for reducing the friction occurring therewith when the sleeve 14 is rotated. The collar 23 is threaded upon the hollow stem 24 which is urged upwardly by a spring 25 seated upon a washer 26 which rests upon the ends of a pin 27 extending through the arbor 10. The arbor is provided with an aperture 28 having an internally threaded section 29 which receives the threaded end 31 of a cone-shaped adjusting element 32 having a tapered or conical end 33.

The hollow stem 24 has a threaded end 34 to which the internaly threaded end 35 of a roller supporting body 36 is secured. The roller supporting body is provided with an odd number of tapered roll pockets 37 which break through the inner and outer wall of the body 36, as illusrated in FIG. 3.

The pockets 37 have flat faces, the face 38 being parallel to a radial plane while the face 39 is approximately 15° from a plane parallel to a radial plane so that the outer space between the faces 38 and 39 is of less diameter than the diameter of the rollers. The slots are narrower at the top than at the bottom conforming to the taper of the rollers. This construction permits the rollers to move inwardly and outwardly a substantial amount permitting the overall diameter to be changed several thousandths of an inch, depending upon the diameter of the tool. Rollers 40 are mounted within the pockets 37 having a taper substantially half that of the tapered end 33 of the adjusting element 32 so as to have the outer edge of the rollers substantially parallel to each other and the axis of the arbor 10.

The tapered end 33 is provided with spaced flutes 41 which are substantially two or three times the width of the intermediate body portion 42 and substantially two flutes are provided for each roller 40. As the cage and rollers advance during the rotation of the arbor the rollers will rotate on the surface of the aperture to be peened and will move into the flutes 41 and thereafter be forcibly moved outwardly when advanced over the body portions 42 to produce the peening action of the rollers on the aperture surface.

By longitudinally adjusting the arbor, the diameter of the finished surface can be accurately maintained and the tool can be employed on apertures of greater and smaller diameters within the capacity of the particular tool. The pockets 37 are herein illustrated as being formed by milling from the end of the cage 36 with a retaining washer 43 welded to the bottom in a manner to provide a slight clearance with the ends of the rollers to permit them to turn freely. The pockets 37 can be formed directly in the cage by electric discharge machining along a chord and at 15° from a spaced chord. The rollers are shown as being extended a maximum amount in FIG. 3, and it is to be understood that they may be contracted several thousandths of an inch upon the upward movement of the conical end 33 of the arbor. The tapered end 33 is adjusted relative to the hollow stem or cage 24 to produce a desired overall diameter across the roller and the tool is then rotated and inserted in the bore with the rollers 40 in engagement with the surface thereof. As the arbor and tool are rotated the rollers are advanced into and through the aperture to peen the surfaces thereof. This occurs through the rolling of the rollers on the surface of the aperture to have the rollers roll over the flutes and body portions on the tapered end of the arbor to produce the peening action by the forcible radial movement of the rollers outwardly thereof into the surface of the workpiece. The peened surface can be produced to an exact diameter due to the longitudinal adjustment of the tapered end and apertures of different diameters may be peened by the tool of the present invention.

What is claimed is:

1. In a peening tool, an elongated arbor having drive means on one end and a tapered section on the other end, a threaded sleeve on said arbor, a roller cage on said arbor mounted for rotation thereon, a thrust bearing between said sleeve and cage, a portion of said cage opposite to the tapered section having slots therein, tapered rollers in said slot in engagement with the tapered section, said rollers being retained within said slot for adjustable inward and outward movement controlled by the longitudinal position of said tapered section, said tapered section having flutes on the outer surface at least as great in number as the number of the rollers and with the flutes and the axis of the rollers disposed in planes through the axis of the arbor.

2. In a peening tool as recited in claim 1, wherein the slots in the cage have one face disposed substantially parallel to a radial plane and the other face approximately 15° from a plane parallel to a radial plane, said slots being of smaller width at the top than at the bottom conforming to the taper of the rollers, the spacing of outer edges being such as to prevent the diameter of the rollers from passing therethrough.

3. In a peening tool as recited in claim 1, wherein locking means are provided for preventing the threaded sleeve from turning after being adjusted.

4. In a peening tool as recited in claim 1, wherein the flutes are located between body sections with the flutes at least twice as wide as said sections.

5. In a peening tool as recited in claim 4, wherein the number of flutes are substantially twice the number of the rollers.

6. In a peening tool as recited in claim 5, wherein the rollers function as planets of a planetary system rolling on the surface of the aperture being peened and on the fluted tapered section of the arbor during the rotation of the tool with the rollers engaging the aperture surface.

References Cited

UNITED STATES PATENTS

| 2,546,756 | 3/1951 | Knowlton | 72—126 |
| 2,898,971 | 8/1959 | Hempel | 72—126 |
| 3,099,070 | 7/1963 | Morrison | 72—126 |
| 3,247,695 | 4/1966 | Linthicum | 72—126 |

CHARLES W. LANHAM, *Primary Examiner.*

G. P. CROSBY, *Assistant Examiner.*

U.S. Cl. X.R.

72—126, 429, 452, 394, 399